W. V. TURNER.
LOAD BRAKE APPARATUS.
APPLICATION FILED OCT. 8, 1906.
1,075,275.
Patented Oct. 7, 1913.
2 SHEETS—SHEET 1.
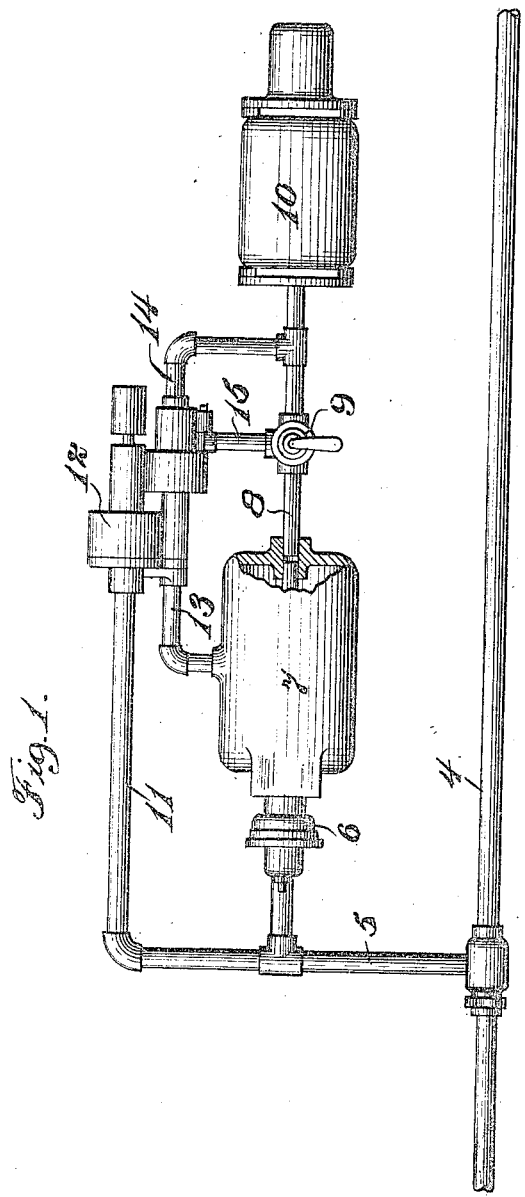
WITNESSES
INVENTOR
Walter V. Turner
by atty Paul Synnestvedt

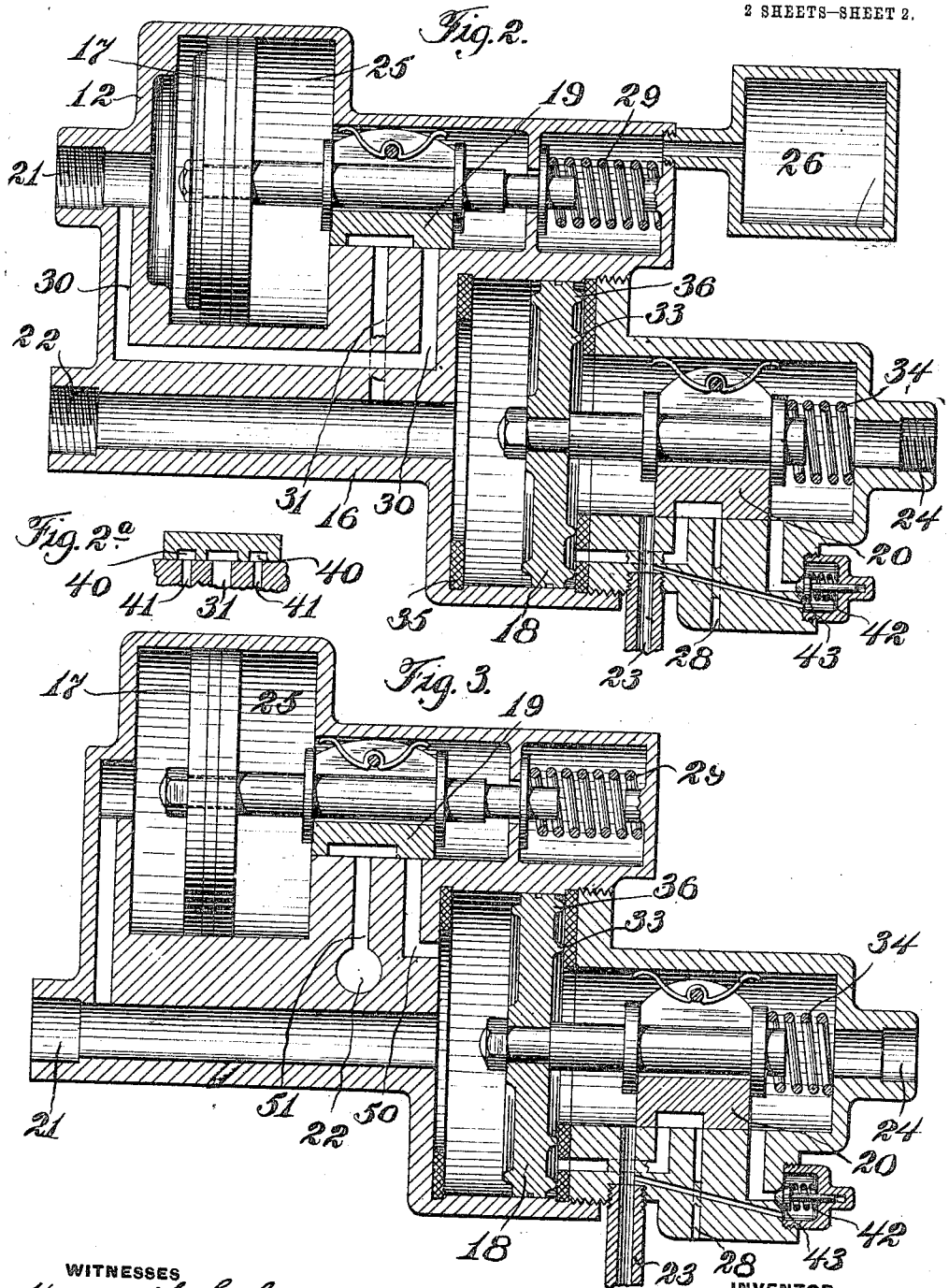

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

LOAD-BRAKE APPARATUS.

1,075,275. Specification of Letters Patent. Patented Oct. 7, 1913.

Original application filed April 1, 1904, Serial No. 201,167. Divided and this application filed October 8, 1906. Serial No. 338,031.

*To all whom it may concern:*

Be it known that I, WALTER V. TURNER, a citizen of the United States, residing at Wilkinsburg, in the county of Allegheny and State of Pennsylvania, have invented certain new and useful Improvements in Load-Brake Apparatus, of which the following is a specification.

This invention has reference to air brake apparatus and particularly to what is known as load brake mechanism, that is mechanism designed for braking cars in proportion to the loads thereof.

This is a division of my application Serial Number 201,167, issued as patent #808,703, Jan. 2, 1906, which said patent contains claims for the generic structure and one specific form thereof. In this application it is desired to cover specifically that form of the invention which was shown particularly in Figures 2 and 3 of said prior application.

The first of the objects of the present invention is the provision of means whereby the braking force of a car can be set either for a loaded car or a light car, and whereby the operation of the automatic appliances on the car will be supplemented by the addition of other mechanism designed to control the flow of air from the triple valve to the brake cylinder when the load brake mechanism is in operative position, and which will be cut out when the manually actuated means for cutting out the said load brake mechanism is turned in different position. While I have shown my improvement herein as applied in conjunction with such manually actuated means for determining whether the car shall be braked as a loaded or light car, still it is to be understood that the same mechanism is applicable where automatic appliances may be employed for making the change from the load brake to the light brake car or vice versa.

A still further object of my invention is the provision of means whereby the surplus of pressure left in the auxiliary reservoir as a result of throttling or cutting off the flow to the brake cylinder on a light car, may be reduced by backflow from the auxiliary reservoir to the train-pipe, through suitable mechanism, which may be actuated by increase of train-pipe pressure on the release of the brakes, or which may possibly be brought about in other ways. Such backflow of pressure from the reservoir to the train-pipe not only facilitates the release of the brakes on that car, but also results in increasing the train-pipe pressure, thereby aiding generally in the release of all the brakes.

It has been heretofore proposed to provide air brake mechanism with devices for throttling the passage between the triple valve and the brake cylinder at a certain predetermined point in order to prevent the accumulation of more than a given amount of pressure in the cylinder when the car has no load upon it. So far as I am aware, devices of this character heretofore used, however, have only shut off the supply from the triple valve to the cylinder and have made no provision for further reduction of the reservoir pressure, whereby the cars which are throttled in this manner are left after a full application, with a higher reservoir pressure from which it is more difficult to effect a release of the brakes, causing these cars to be the last to let go, and in some instances—especially where several such cars are toward the rear end of the train—rendering the train liable to be pulled in two.

The above, as well as other such objects as may hereinafter appear, I attain by means of a construction which I have illustrated in the accompanying drawings, wherein—

Figure 1 is a plan view showing the apparatus employed under a car in conjunction with my improvement, the same illustrating a cylinder, reservoir and triple valve with a portion of train-pipe, and my automatic valve mechanism applied in conjunction with said other parts;

Figure 2 is a sectional view of my improved valve mechanism taken on a horizontal plane on Figure 1;

Figure 2^A is a small detail sectional view of a certain feature of the improvement designed to hold the valve to its seat, and Figure 3 is a sectional view similar to the view given in Figure 2, but in which a slight modification of the improvement is illustrated.

Referring to Figure 1, it will be seen that I have therein shown a portion of train-pipe 4 with a branch pipe 5 leading to a triple valve 6 which is attached to an auxiliary reservoir 7 that is connected through the triple valve and pipe 8 past the three-way cock 9 with a brake cylinder 10 of usual construction.

The branch pipe 5 has an extension 11 projected around to connect with a valve mechanism indicated at 12 which also has a connection by means of a pipe 13 with the auxiliary reservoir as shown, and another connection by means of the pipe 14 with the brake cylinder and still another connection by means of the pipe 15 with the three-way cock 9.

The valve mechanism indicated at 12 is shown on a larger scale and in section in Figure 2, to which reference will now be made. It will be seen that the same comprises a casing 16 within which are mounted two pistons 17 and 18 connected respectively with slide valves 19 and 20.

The train-pipe connection is at 21, the auxiliary reservoir at 22, the pipe leading from the triple valve to the cylinder at 23, and a brake cylinder connection is at 24, while the chamber at the right of the piston 17, that is, the chamber 25 which contains the slide valve 19, is provided with an enlargement by means of a reservoir 26 connected as shown. At 28 there is an outlet to the atmosphere which in the position of the parts shown creates a differential of pressures on opposite sides of the piston 18, as will be understood when further description of the operation of the apparatus is given.

From the position of the several connections just above referred to, it will be obvious that the piston 18 is balanced between auxiliary reservoir pressure and the pressure of the brake cylinder when there is any pressure admitted past the triple valve in making applications of the brakes, while the piston 17 is balanced between train-pipe pressure and the pressure in the chamber 25 at the right of the piston 17 which is in connection with the expansion or enlargement chamber 26. The valve 19 which is connected with the piston 17 is arranged so that when in normal position, it will be held by the spring 29 in the position shown where the port 30 leading from the train-pipe to the seat of the valve will be closed. When an increase in train-pipe pressure is made, however, the valve 19 will be forced to the right against the pressure of the spring 29 and connect the port passage 30 with the passage 31, establishing communication between the train-pipe and reservoir.

The valve 20 actuated by the piston 18 controls the passage 23 leading from the triple valve to the brake cylinder, and in the position shown, uncovers said passage, the action being supplementary to that of the triple valve. It also controls the opening or outlet 28 to the atmosphere whereby differential pressures are produced on the piston 18.

The operation of my improvement is as follows:

Supposing the apparatus to be set with the three-way cock 9 in position so that air in order to pass from the triple valve to the brake cylinder will pass through the pipes 14 and 15 and the mechanism shown in Figure 2, if now an application of the brakes be made a reduction in train-pipe pressure is first effected, after which there will be an automatic reduction in auxiliary reservoir pressure which will as the application increases reduce the pressure gradually on the left side of the piston 18 until it has reached such a point that the pressure on the piston 18 at the left is overcome by the pressure of the spring 34 and the air which comes from the triple valve into the cylinder through the opening 23 and bears on the right side of the piston 18 within the rings marked 33, when the piston will be moved to the left against the pressure in the auxiliary reservoir, the movement being aided somewhat by the increased area exposed, until it strikes the gasket 35 where the piston will stop and make a tight seat on the gasket, leaving the slide valve 20 in position to close the port or passage 23 and cut off further flow of air from the triple valve to the brake cylinder, and also to close the port 28 leading to the atmosphere. It will thus be seen that by properly proportioning the strength of the spring plus the area of the piston 18 of the right side within the rings 33, and the area between the rings 33 and the rings 36, the slide valve 20 can be caused to cut off the flow of air from the triple to the cylinder at any desired point. If thus it be arranged that the maximum pressure in the brake cylinder on a load is about twice the maximum pressure desired on a light car, the proportionate areas and spring can be so fixed that the piston 18 will move the slide valve 20 at just the right point to cut off the flow from the triple to the cylinder when one-half the pressure in the cylinder has been accumulated on a light car.

The brake having been thus applied and the valve 20 having cut off the passage 23 leading to the brake cylinder, any further reduction of pressure in the train-pipe will not of course produce any further reduction in the auxiliary reservoir pressure on that particular car, and after a full application has been made it will require a higher pressure in the train-pipe to release that brake than any other brake on the train not similarly governed. In order to overcome this difficulty I provide the mechanism embodied in the valve 19 and the piston 17, whereby when the train-pipe pressure is increased slightly above the pressure at the right of the piston 17, the piston 17 will be pushed over against the strength of the spring 29 and the pressure on the right side of the piston 17 and when it moves over will connect the passages 30 and 31 and thereby permit the reservoir pressure connected through the passage or opening 22 to flow back into the train-pipe and equalize the train-pipe and reservoir on that car, after which the triple valve of the car will perform its function in releasing in the usual manner. At the same time that this reduces the auxiliary reservoir pressure it increases the train-pipe pressure, aiding to effect the release of the brakes.

It will be observed that the chamber at the right normally contains train-pipe pressure, since said chamber is of small capacity and there is some leakage back and forth past the piston, and the increase at the left only acts temporarily or until equalization takes place. Thus the valve 19 and the piston 17 really act as a quick action release device, since the piston moves responsively at each increase in train-pipe pressure (because of the pressures on its opposite sides being normally maintained at equalization) whereby the higher pressure of the auxiliary reservoir is allowed to flow to the train-pipe, and this besides facilitating the release of that particular brake as stated above, aids in releasing the other brakes.

As a means to prevent the valves 19 and 20 from being raised off their seats by the superior pressure acting on the port openings under their faces as occurs at times during the operation, I have provided the said valves with certain port openings indicated in Figure 2$^A$ at 40, which port openings are arranged so as to communicate with the atmosphere through passages 41 and create a preponderance of pressure above the valves, tending to hold them to their seats.

As it obvious with the mechanism just above described, the cutting off of the passage from the triple to the brake cylinder would interfere with the release unless some other means were provided for taking care of such function of the brake, I have introduced a small check valve indicated at 43, held by a spring 42, this check valve preventing any flow of air from the triple to the cylinder through that passage in making applications, but opening when the return flow occurs, so as to allow the cylinder pressure to flow back through the opening 23 and out at the triple valve exhaust in the usual manner.

In Figure 3 I have indicated a slightly modified form of the improvement, in which it will be seen by examination of the drawing, I utilize the same slide valves 19 and 20 and the same pistons 17 and 18 and a similar disposition of port openings, and so far as concerns the piston 18 and slide valve 20, the same arrangement and operation of all the several parts, but in which the piston 18 is balanced between train-pipe pressure and pressure in the cylinder admitted from the triple valve instead of being balanced between reservoir pressure and the pressure in the cylinder, as is the case in the device of Figure 2. Thus it will appear that in the device shown in Figure 3 the reduction in train-pipe pressure directly effects the movement to the left of the piston 18 and the closure of the passage from the triple valve to the brake cylinder, and in the release of the brakes in the device shown in Figure 3 the increase in train-pipe pressure tends to move the piston 17 to the right against the resistance of the spring 29 and the air on the right side of the piston 17 and establish communication between the passages 50 and 51, whereby the train-pipe is put into communication with the auxiliary reservoir that communicates through the port opening or passage 22 so that the reservoir having higher pressure than the equalized pressure on the other cars can be slightly reduced in pressure by the air flowing through the passages 51 and 50 and back into the train-pipe as soon as the increase in trainpipe pressure has moved the valve 19 over to the right.

Having thus described my invention and illustrated its use, what I claim as new and desire to secure by Letters Patent, is the following:

1. A valvular mechanism for automatic air brakes comprising in combination an auxiliary reservoir, a train pipe, a brake cylinder, means whereby the reduction of auxiliary reservoir pressure is terminated short of full equalization, a valve casing having a passage for establishing communication between said auxiliary reservoir and said train pipe, means operative under variations in train pipe pressure to control said passage and permit back-flow from the auxiliary reservoir to the train pipe whereby to reduce auxiliary reservoir pressure, and augment the pressure of the train pipe, substantially as described.

2. An automatic load brake mechanism for air brakes comprising in combination an auxiliary reservoir, a train pipe, a brake cylinder, and a valvular device provided with a passage to permit back flow from the auxiliary reservoir to the train pipe, means actuated by train pipe pressure to control said passage, and means supplementary to the triple valve for throttling the flow of air from said auxiliary reservoir to said brake cylinder.

3. In automatic air brake mechanism, the combination with an auxiliary reservoir, a train pipe and a triple valve device, of a passage to permit a back flow from the auxiliary reservoir to the train pipe and a valve actuated by pressure from the train pipe and adapted in one position to permit a back flow of pressure from the auxiliary reservoir to the train pipe and in another position to prevent a flow of pressure from the train pipe to the auxiliary reservoir.

4. A valvular mechanism for automatic air brakes, comprising in combination, an auxiliary reservoir, a train-pipe, a valve casing having a passage for establishing communication between said auxiliary reservoir and said train-pipe, and a valvular device for controlling said passage, having an abutment for actuating said valvular device, balanced between train-pipe pressure and the pressure of a special or supplemental reservoir additional to the auxiliary reservoir, and so constructed as to normally prevent a flow from the train pipe to the auxiliary reservoir, and when moved by increased train pipe pressure, to permit backflow from the auxiliary reservoir to the train-pipe for the purpose of reducing reservoir pressure, and augmenting the pressure of the train-pipe, substantially as described.

5. In automatic air brake mechanism, the combination with an auxiliary reservoir, a train pipe and a triple valve device, of a passage to permit a back flow from the auxiliary reservoir to the train pipe and a valvular device normally closing the passage and preventing a flow from the train pipe to the auxiliary reservoir and adapted, on an increase of train pipe pressure to be moved thereby to a position to permit a back flow from the auxiliary reservoir to the train pipe.

In testimony whereof I have hereunto signed my name in the presence of the two subscribed witnesses.

WALTER V. TURNER.

Witnesses:
R. F. EMERY,
J. B. MACDONALD.